United States Patent
Powers et al.

(10) Patent No.: US 7,093,338 B2
(45) Date of Patent: Aug. 22, 2006

(54) METHOD AND APPARATUS FOR FIXING ASSEMBLY HAVING RESILIENT TOOL CONNECTION

(75) Inventors: Jeffrey R. Powers, Larchmont, NY (US); Paul Gaudron, Stamford, CT (US)

(73) Assignee: Powers Fasteners, Inc., Brewster, NY (US)

( * ) Notice: Subject to any disclaimer, the term of this patent is extended or adjusted under 35 U.S.C. 154(b) by 47 days.

(21) Appl. No.: 10/697,799

(22) Filed: Oct. 31, 2003

(65) Prior Publication Data

US 2005/0091822 A1    May 5, 2005

(51) Int. Cl.
B23P 11/00    (2006.01)
(52) U.S. Cl. ............... 29/525.01; 29/798; 227/107
(58) Field of Classification Search ............ 29/525.01, 29/798; 227/8, 10, 107, 120, 220; 411/440, 411/441
See application file for complete search history.

(56) References Cited

U.S. PATENT DOCUMENTS

| | | | | |
|---|---|---|---|---|
| 2,968,984 | A * | 1/1961 | De Caro | 411/441 |
| 3,320,845 | A | 5/1967 | Eschweiler | |
| 3,377,903 | A * | 4/1968 | Everardus | 411/441 |
| 3,408,891 | A * | 11/1968 | Hartmann | 411/441 |
| 3,490,329 | A * | 1/1970 | Pratorius | 411/441 |
| 3,516,323 | A * | 6/1970 | O'Brien | 411/441 |
| 3,618,445 | A * | 11/1971 | Hartmann et al. | 411/441 |
| 3,638,892 | A | 2/1972 | Boye et al. | |
| 4,028,986 | A | 6/1977 | Beton | |
| 4,102,238 | A * | 7/1978 | Thurner | 411/441 |
| 4,286,496 | A | 9/1981 | Harris | |
| 5,110,247 | A * | 5/1992 | Losada | 411/441 |
| 5,178,503 | A * | 1/1993 | Losada | 411/441 |
| 5,484,094 | A | 1/1996 | Gupta | |
| 5,569,010 | A * | 10/1996 | Janssen et al. | 411/441 |
| 5,624,220 | A | 4/1997 | Janssen et al. | |
| 5,788,444 | A | 8/1998 | Losada | |
| 6,145,723 | A * | 11/2000 | Gupta | 227/8 |
| 6,260,519 | B1 | 7/2001 | Phillips | |
| 6,598,775 | B1 | 7/2003 | Chen | |
| 6,820,789 | B1 * | 11/2004 | Lipsky et al. | 227/120 |
| 7,007,364 | B1 * | 3/2006 | Robertson et al. | 29/432 |
| 2003/0041696 | A1 | 3/2003 | Lipsky et al. | 81/57.37 |

FOREIGN PATENT DOCUMENTS

WO    WO 90/15261    * 12/1990

* cited by examiner

Primary Examiner—Essama Omgba
(74) Attorney, Agent, or Firm—Morgan, Lewis & Bockius LLP

(57) ABSTRACT

A fixing assembly for attaching a fixing to a workpiece, having a fixing and a resilient member. The fixing includes an aperture and is adapted for mating with the workpiece and holding the fixture. The resilient member includes a first portion secured in the aperture, and a second portion adapted for frictional engagement with a nosepiece of a fastener-driving tool.

19 Claims, 8 Drawing Sheets

METHOD AND APPARATUS FOR FIXING ASSEMBLY HAVING RESILIENT TOOL CONNECTION

The invention relates generally to a fixing for attaching a fixture to a workpiece and a method for securing a fixing to a workpiece using a fastener-driving tool, such as a nail gun. More particularly, the invention relates to an assembly for coupling a fixing to a nose-piece of a fastener-driving tool.

BACKGROUND OF THE INVENTION

Fixings for attaching a fixture to a workpiece, and methods of securing fixings to a workpiece using a fastener-driving tool, such as a nail gun, are known. U.S. Pat. No. 5,484,094 discloses a fastener-driving tool for securing a washer plate made of magnetizable steel to a workpiece. A strip of fasteners are connected by a polymeric sleeve and fed into the tool. The tool has a nosepiece that is adapted to drive the fasteners, one at a time, from the nosepiece, into a workpiece. A workpiece-contacting probe includes two permanent magnets, and is mounted to the nosepiece for magnetically holding the washer plate between the nosepiece and the workpiece. A fastener is driven from the nosepiece, through the washer plate held by the workpiece-contacting probe, and into the workpiece. In U.S. Pat. No. 6,598,775, a hammer head assembly for driving a nail into objects to be fastened includes a nail holder mounted in a hollow mounting base and a magnet provided inside the nail holder and to attract a nail for driving into the workpiece.

It would be desirable to have a fixing for securing a fixture to a workpiece that can be easily attached to a nosepiece of fastener-driving tools, adapted for use with any of the variety of fixings that are typically secured to a workpiece using a fastener, such as a nail or pin, and without requiring the use of an adaptor or other special attachments to the nosepiece of the fastener driving tool for retaining the fixing to the nosepiece.

SUMMARY OF THE INVENTION

The above needs are met, and the shortcomings of prior art are overcome by the fixing assembly of the invention. In particular, the invention provides a fixing assembly that may be easily attached to a nosepiece of a fastener-driving tool. Once attached, the fixing may then be conveniently located on the workpiece using the fastener-driving tool. The invention utilizes a resilient member attached to the fixing as in, for example, a deformable disc that can be press-fit into the nosepiece. The fixing may be held to the nosepiece, and the fastener driven through the fixing and into the workpiece, without requiring the use of an attachment or adapter for retaining the fixing to the nosepiece.

According to one embodiment, a fixing assembly includes a fixing adapted for being mounted to a workpiece, and a disc-shaped deformable piece secured to the fixing, and adapted for engaging a fastener exit of a fastener-driving tool. The disc-shaped piece may have a height and a width, the height being less than the width. The disc-shaped piece may have a substantially flat upper surface.

In another embodiment, a fixing assembly includes a fixing adapted for being mounted to a workpiece, and a resilient member having a first portion secured to the fixing, and a second portion adapted for frictional engagement with a fastener-ejection portion of a fastener-driving tool. The second portion may be shaped as a disc having a diameter greater than an entrance diameter of the fastener-ejection portion. The fixing may include an aperture for receiving the first portion of the resilient member. The fixing may be shaped as a washer.

In another embodiment, a method of attaching a fixing to a workpiece using a fastener-driving tool is provided. The fastener driving tool may be of the type having a magazine containing fasteners, and a firing chamber for discharging fasteners from a nosepiece. The method may include providing a resilient member on the fixing, securing the resilient member at the nosepiece of the tool, locating the fixing on the workpiece, advancing a fastener into the firing chamber, and driving the fastener into the fixing, to secure the fixing to the workpiece. The resilient member may be secured by frictionally engaging the resilient member to the nosepiece to retain the fixing to the nosepiece by frictional forces. The resilient member may be secured by engaging the resilient member with an inner wall of the nosepiece. An aperture may be provided in the fixing for securing a portion of the resilient member to the fixing.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings:

FIG. 2b is a cross-sectional view of the nosepiece with attached fixing assembly of FIG. 2a.

DETAILED DESCRIPTION OF THE PREFERRED EMBODIMENTS

The fixing assembly of the invention provides a fixing and a resilient member secured to the fixing, examples of which are illustrated in the appended drawings. The fixing may be a washer, clip, channel, bracket or any other type of fixing that is used to mount fixtures to a workpiece. The resilient member may be secured at the fastener exit opening of the fastener-driving tool, which typically corresponds to a nosepiece. The resilient member may be made of a resilient material so as to make it readily securable to a nosepiece by, e.g., a press-fit within an opening of the nosepiece. Preferably, the resilient member is elastically deformed when fitted to the nosepiece and as such, a preferred material is a relatively highly elastic material, such as rubber or soft plastic. The resilient member may also be constructed in such a manner that the resilient member undergoes an inelastic deformation when inserted into the nosepiece opening. For example, the resilient member may be made of a material that is plastically deformed when attached to a nosepiece. Such an embodiment may provide a firmer hold at the nosepiece and thus may be preferred in situations where relatively heavy fixings are to be secured to the nosepiece during use. Either of these embodiments are contemplated and in either embodiment, the resilient member may be formed so as to be securable to any type or nosepiece. Therefore, the tool should not need an adapter or attachment. In other embodiments, the resilient member may be adapted for being snap or press fitted to an outer structure of the nosepiece, such as a rim or flange located near the fastener exit.

Figure 4:
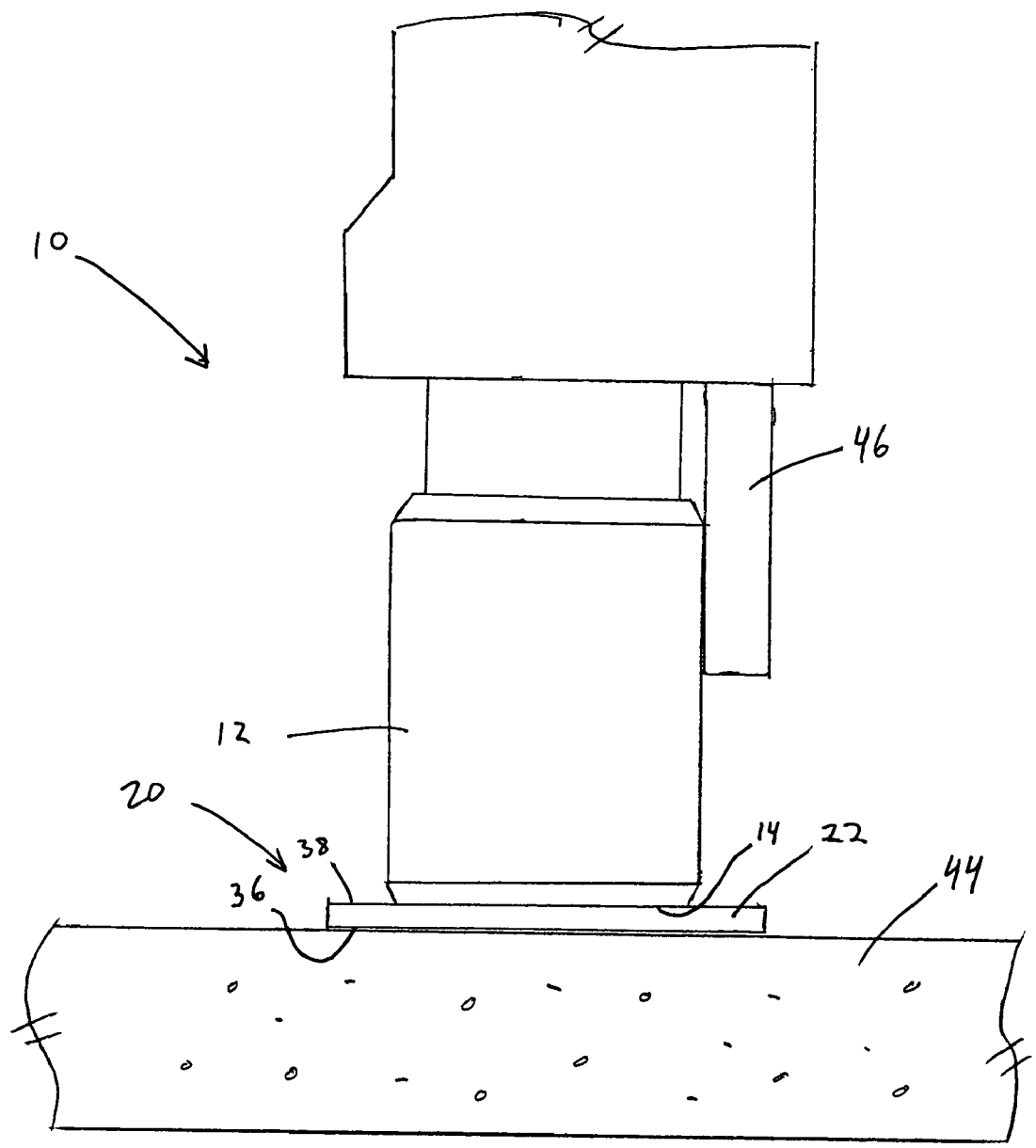
FIG. 4 is a side view of the fixing assembly of FIG. 1 attached to the nosepiece with the fixing member placed against a workpiece.

Attaching the resilient member to the nosepiece will temporarily hold the fixing to the fastener-driving tool so that a user may locate the fastener-driving tool and fixing on the workpiece without having to separately hold the fixing to the fastener-driving tool, or separately place the fixing on the workpiece before the fastener can be inserted through the fixing and into the workpiece. As illustrated in FIG. 4, the fixing is secured to the end of the barrel and held thereto as the user locates the area of the workpiece for the fixing.

Any type of fastener-driving tool adapted for securing fixings to a workpiece may be used with the fixing assembly of the invention. An example of such a tool is described in U.S. Pat. No. 6,260,519, the disclosure of which is incorporated by reference for all purposes. In these types of tools, fasteners are typically provided as a collated strip of fasteners which are fed into a magazine. When the device is ready for use, the fasteners are advanced from the magazine and into the firing chamber and then struck by a hammer or firing pin.

Figure 1:
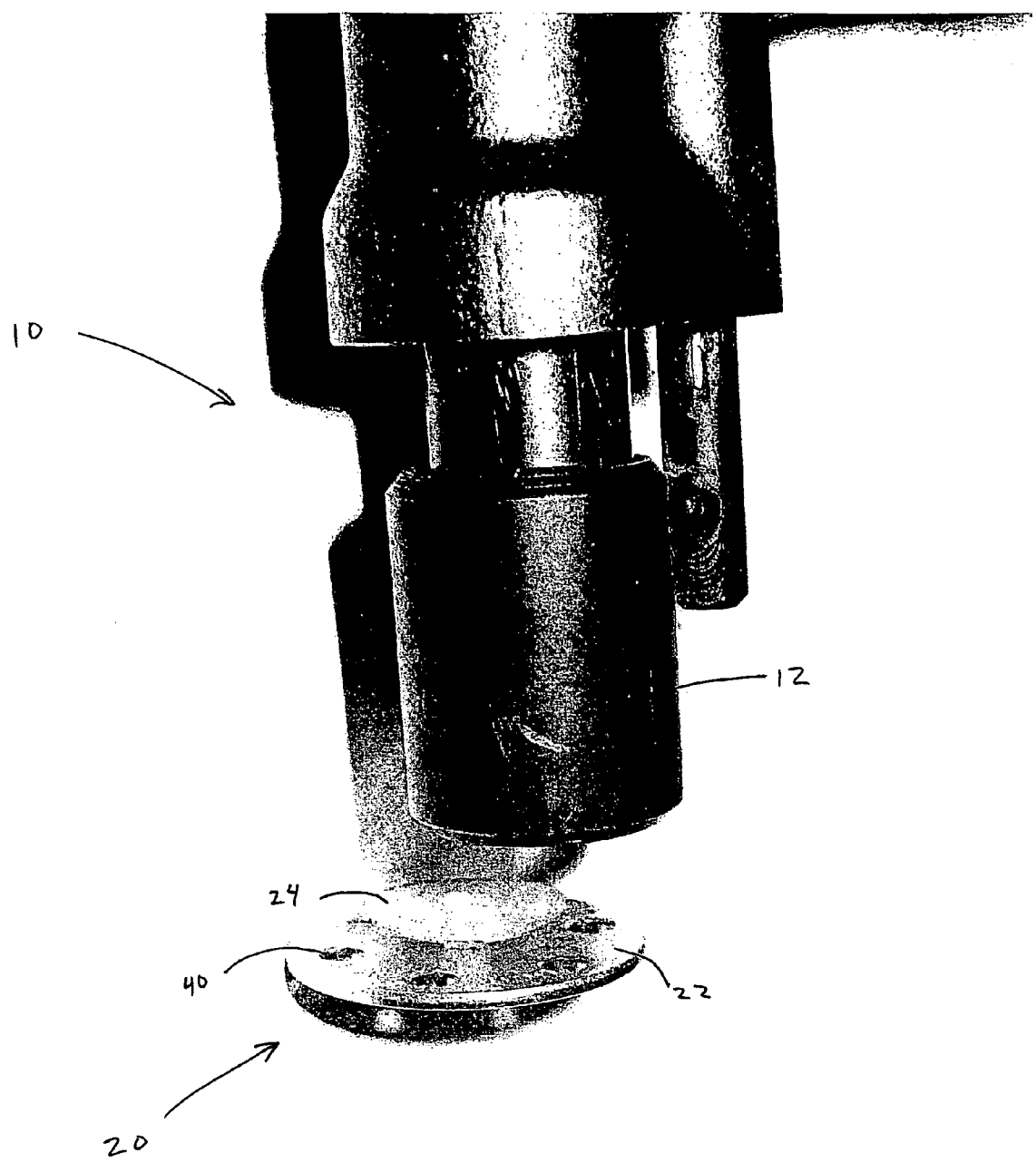
FIG. 1 is a perspective view of a preferred embodiment of a fixing assembly incorporating the principles of invention together with a nosepiece of a fastener-driving tool.
Figure 2A:
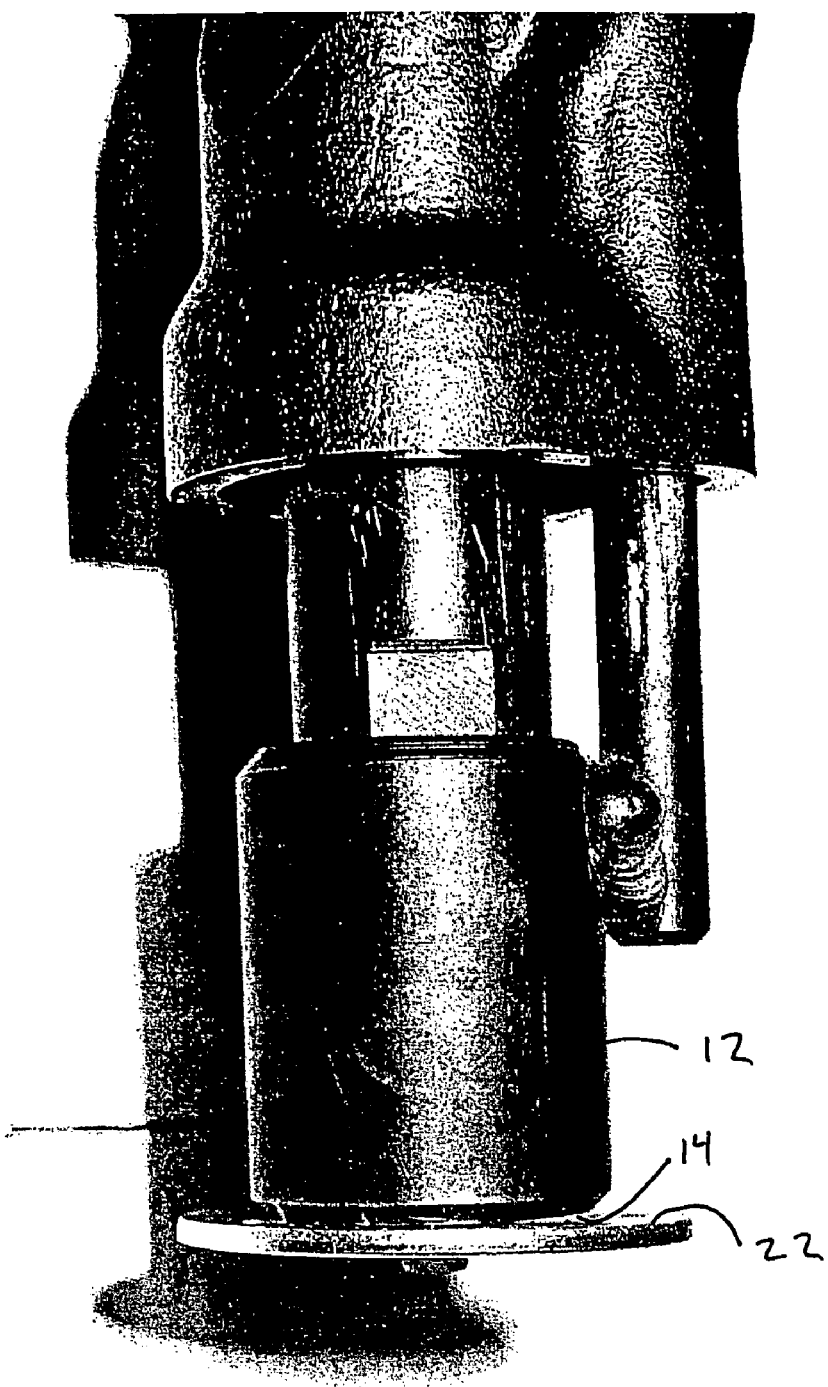
FIG. 2a is a perspective view of the fixing assembly of FIG. 1 attached to the nosepiece.
Figure 2B:
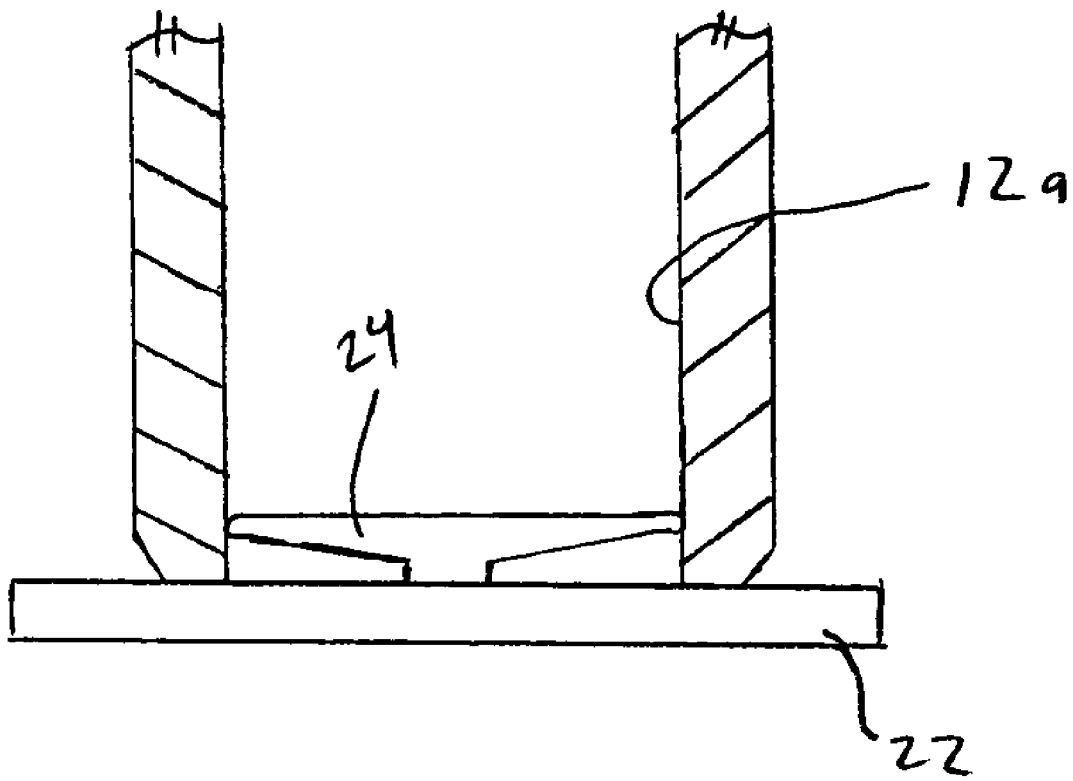

A preferred embodiment of a fixing assembly 20 of the invention is illustrated with a nosepiece of a fastener driving tool in FIGS. 1–2. Fixing assembly 20 includes fixing 22 and resilient member 24, as described in more detail below. Referring to FIGS. 2a and 2b, a resilient member 24 is preferably press-fit to the barrel 12 of the fastener-driving tool 10, so that resilient member 24 frictionally engages an inner wall 12a of barrel 12. As noted above, resilient member may be sized so that it is capable of retaining fixings of various sizes and weights to the nosepiece.

Figure 3A:
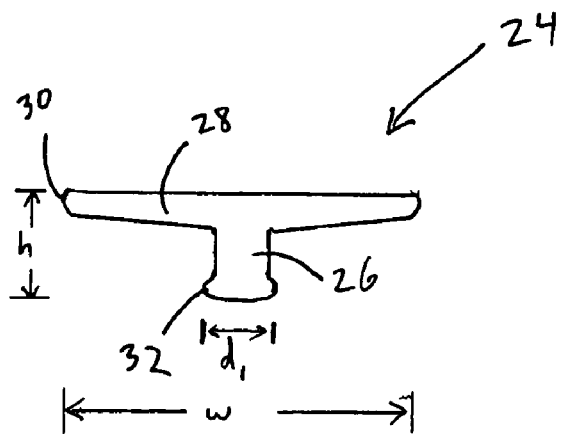
FIG. 3a is a side view of a resilient member of the fixing assembly.

FIG. 3a illustrates a side view of resilient member 24. Referring to FIGS. 1 and 3a, resilient member 24 includes a first portion 26 and a second portion 28 that takes the approximate shape of a disc. In other embodiments, second portion 28 may be shaped as, e.g. a deformable bulbous piece, such as a sphere or ellipsoid. In another embodiment, second portion 28 may take the shape of a plurality of deformable arms extending outwardly from first portion 26. In each of these embodiments, resilient member 24 may be made of soft plastic or rubber or a relatively inelastic plastic, for example, which deforms as it is inserted into the nosepiece, thereby creating a frictional hold against the walls of the nosepiece. First portion 26 is preferably formed as an elongate piece extending from second portion 28. Referring to FIGS. 3a, 3b, 3c, and 3d, an aperture 34 may be formed in fixing 22 for receiving first portion 26. Resilient member 24 may be held within aperture 34 by forming an enlarged tip 32 so as to prevent resilient member 24 from separating from fixing 22. Resilient member 24 may be fixed to fixing 22 by press-fitting first portion 26 through aperture 34, or resilient member 24 may be molded directly to fixing 22.

In a preferred embodiment, first portion 26 has a tip 32 with diameter ($d_1$). Diameter ($d_1$) is larger than a diameter ($d_2$) of aperture 34. Tip 32 may be forcibly inserted through aperture 34 because tip 32 is resilient. When first portion 26 is disposed within aperture 34, tip 32 extends beyond aperture 34 to engage a lower surface 36 of fixing 22. In this manner, tip 32 secures resilient member 24 to fixing 22. In another embodiment, first portion 26 may be fixed to a top surface 38 of fixing 22 using an adhesive.

Figure 3B:
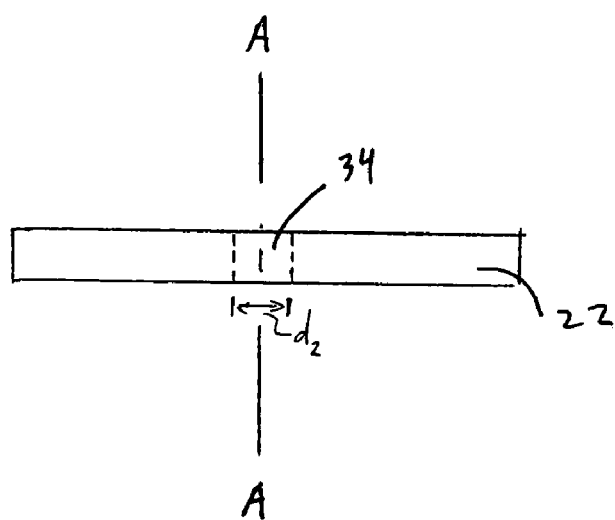
FIG. 3b is a side view of a fixing of the fixing assembly.
Figure 3C:
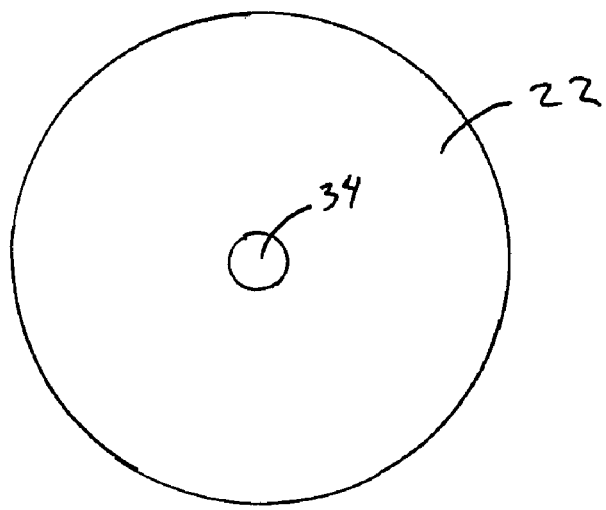
FIG. 3c is a plan view of the fixing of FIG. 3b.
Figure 3D:
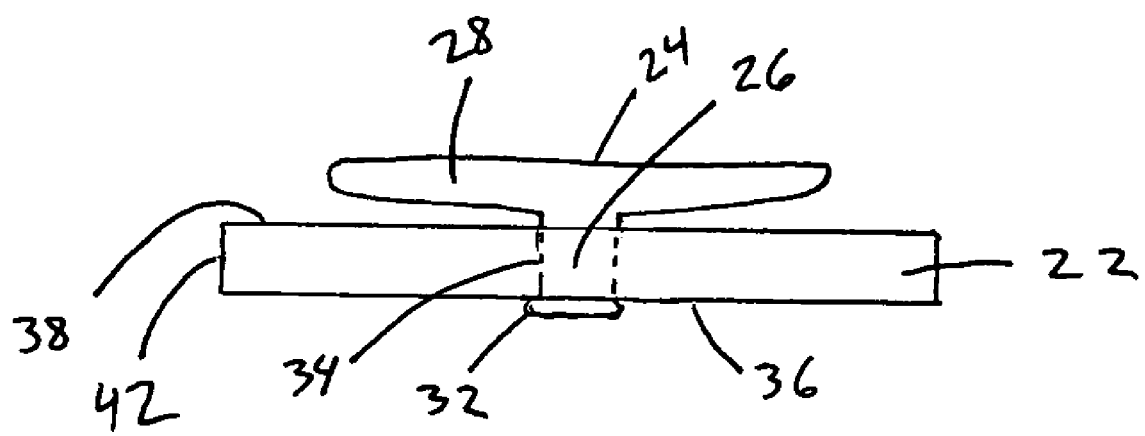
FIG. 3d is a side view of the fixing assembly.
Figure 6:
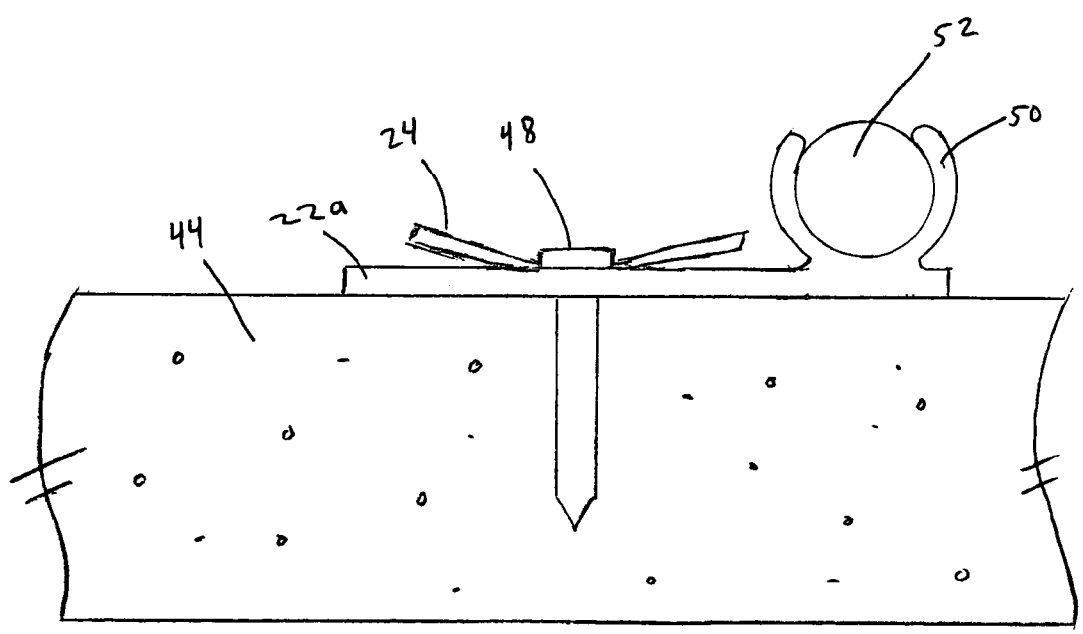
FIG. 6 is a side view of a second embodiment of a fixing assembly secured to a workpiece by a fastener.

FIGS. 3b–3c illustrate one example of a fixing 22, e.g., a washer. In general, fixing 22 may correspond to any type of fixing used to secure fixtures to a workpiece. For example, fixing 22 may be formed having a cable clip 50, as illustrated in FIG. 6. Fixing 22 has a top surface 38, bottom surface 36, and side surface 42 extending between top surface 38 and bottom surface 36. Fixing 22 may include aperture 34 disposed around a central axis A—A (for securing resilient member 24 as discussed above), which extends between top surface 38 and bottom surface 36. Fixing 22 may have thru-holes 40, as shown in FIG. 1, or other structure as dictated by the particular use for the fixing. Again, any type of fixing that is securable using a fastener-driving tool may be provided with a resilient member. Therefore a particular type of fixing is not considered a limitation on the scope of the invention.

Referring to FIG. 3a, second portion 28 of resilient member 24 has a width (w) that is preferably larger than an inner diameter of a barrel 12 so as to facilitate a frictional hold against barrel 12, and a height (h). In a preferred embodiment, the ratio of the height to the width, or the aspect ratio, is less than one (i.e. "unity").

Figure 5:
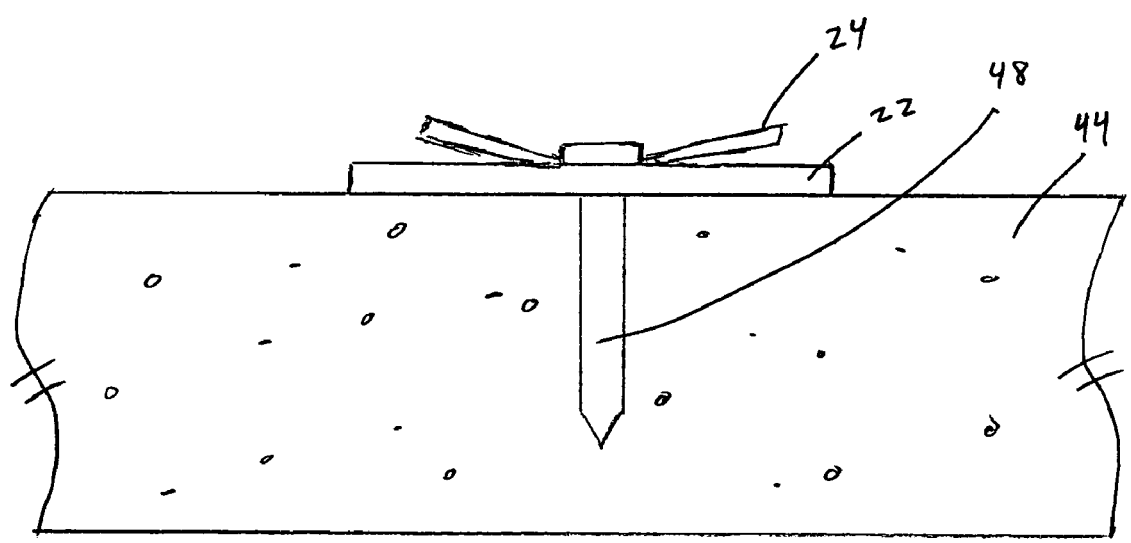
FIG. 5 is a side view of the fixing assembly secured to the workpiece by a fastener.

Referring to FIG. 4, a method for securing a fixing to a workpiece according to the invention will now be discussed using a preferred embodiment of the invention described in FIGS. 1–3. Fixing assembly 20 is secured at the nosepiece of the fastener-driving tool by engaging a resilient member 24 with the nosepiece, e.g., by press-fitting resilient member 24 against inner wall 12a of the nosepiece as illustrated in FIG. 2b. Once secured at the nosepiece, the user may then locate fixing 22 on a workpiece 44 using the fastener-driving tool. The user may then press the nosepiece and fixing assembly 20 against the workpiece, advance a fastener from the magazine into the firing chamber, and discharge the fastener into fixing assembly 20 and then into workpiece 44. FIG. 5 shows the fixing 20 secured to workpiece 44 by a fastener 48. The remains of resilient member 22 may be left in place or removed, depending on needs.

FIG. 6 illustrates a fixing 22a of a fixing assembly 20 secured to a workpiece 44 with a fixture attached to fixing 22a. In this example, fixing 22a is a cable clip 50 which is attached to a cable fixture 52.

Although the foregoing description is directed to the preferred embodiments of the invention, it is noted that other variations and modifications will be apparent to those skilled in the art, and may be made without departing from the spirit or scope of the invention.

What is claimed is:

1. A method of attaching a fixing to a workpiece using a fastener-driving tool having a magazine containing fasteners and a firing chamber having a barrel with an inner wall for discharging fasteners from a nosepiece of the fastener-driving tool, the method comprising:
  providing a disc-shaped resilient member on the fixing;
  providing an aperture in the fixing and securing a portion of the resilient member through the aperture;
  securing the resilient member to the inner wall of the barrel at the nosepiece of the tool;
  locating the fixing on the workpiece;
  advancing a fastener into the firing chamber; and
  driving the fastener into the fixing, thereby securing the fixing to the workpiece.

2. The method of claim 1, wherein the securing step includes frictionally engaging the resilient member with the inner wall of the barrel at the nosepiece to retain the fixing thereto.

3. The method of claim 2, wherein the resilient member is press-fit into the inner wall of the barrel at the nosepiece.

4. A fixing assembly, comprising:
  a fixing adapted for being mounted to a workpiece; and
  a resilient member having a first portion secured to the fixing, and a second portion adapted for frictional engagement with an inner wall of a barrel of a fastener-driving tool, the resilient member having a width and a height wherein the ratio of the height to the width is less than unity,
  wherein the fixing further comprises an aperture and at least part of the first portion of the resilient member extends through the aperture and engages the fixing.

5. The fixing assembly of claim 4, wherein the second portion approximates a disc.

6. The fixing assembly of claim 5, wherein the disc has a diameter that is greater than an inner diameter of the barrel.

7. The fixing assembly of claim 4, wherein the second portion has a width and a height, the width of the second portion being greater than the height of the second portion.

8. The fixing assembly of claim 4, wherein the fixing is a washer.

9. The fixing assembly of claim 4, wherein the fixing has a non-circular shape.

10. The fixing assembly of claim 9, wherein the fixing is a clip.

11. The fixing assembly of claim 4, wherein the resilient member is made of a plastically deformable material.

12. The fixing assembly of claim 4, wherein the second portion of the resilient member further comprises a plurality of deformable arms.

13. The fixing assembly of claim 4, wherein the resilient member is a cupped disc.

14. A fixing assembly, comprising:
  a fixing adapted for being mounted to a workpiece; and
  a resilient member having a first portion secured to the fixing, and a second portion adapted for frictional engagement with an inner wall of a barrel of a fastener-driving tool, the resilient member having a width and a height wherein the ratio of the height to the width is less than unity,
  wherein the fixing further comprises an aperture and at least part of the first portion of the resilient member extends through the aperture, the first portion of the resilient member including an enlarged tip that engages a lower surface of the fixing.

15. The fixing assembly of claim 14 wherein the aperture has a diameter and the enlarged tip has a diameter larger than the diameter of the aperture.

16. A combination fastener-driving tool and fixing assembly, the combination comprising:
  a fastener-driving tool having a hollow barrel defining an inner wall and a first diameter;
  a fixing adapted for being mounted to a workpiece and defining an aperture therein having a second diameter;
  a resilient member having a first portion and a second portion adapted for frictional engagement with the inner wall of the fastener-driving tool barrel, at least part of the first portion extending through the fixing aperture and engaging the fixing, the second portion having a height and a width greater than the height;
  wherein the width of the resilient member is larger than the first diameter of the barrel of the fastener-driving tool.

17. The fixing assembly of claim 16, wherein the first portion includes a tip having a diameter larger than the second diameter of the fixing aperture.

18. The fixing assembly of claim 16, wherein the second portion of the resilient member further comprises a plurality of deformable arms.

19. The fixing assembly of claim 18, wherein the second portion of the resilient member is shaped like a disc.

\* \* \* \* \*